(12) United States Patent
Shen

(10) Patent No.: US 8,320,775 B2
(45) Date of Patent: Nov. 27, 2012

(54) METHOD AND DEVICE FOR BIAS CONTROL OF A LASER MZ MODULATOR

(75) Inventor: Jianqing Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 159 days.

(21) Appl. No.: 13/061,709

(22) PCT Filed: Aug. 3, 2009

(86) PCT No.: PCT/CN2009/073058
§ 371 (c)(1),
(2), (4) Date: Mar. 3, 2011

(87) PCT Pub. No.: WO2010/025641
PCT Pub. Date: Mar. 11, 2010

(65) Prior Publication Data
US 2011/0164300 A1  Jul. 7, 2011

(30) Foreign Application Priority Data

Sep. 5, 2008 (CN) .......................... 2008 1 0215037

(51) Int. Cl.
*H04B 10/04* (2006.01)
(52) U.S. Cl. ........ 398/198; 398/185; 398/186; 398/197; 398/201; 372/38.04; 372/26; 372/31; 372/6
(58) Field of Classification Search .................. 398/185, 398/186, 197, 198, 201; 372/38.04, 263; 359/238, 239, 315
See application file for complete search history.

(56) References Cited

U.S. PATENT DOCUMENTS

| | | | |
|---|---|---|---|
| 5,003,624 | A | 3/1991 | Terbrack et al. |
| 5,557,445 | A | 9/1996 | Misaizu |
| 5,629,792 | A | 5/1997 | Masaki |
| 5,742,268 | A | 4/1998 | Noda |
| 5,812,572 | A | 9/1998 | King et al. |

(Continued)

FOREIGN PATENT DOCUMENTS

CN 101089676 A 12/2007

(Continued)

OTHER PUBLICATIONS

International Search Report on international application No. PCT/CN2009/073058, mailed on Nov. 12, 2009.

(Continued)

*Primary Examiner* — Evelyn A. Lester
(74) *Attorney, Agent, or Firm* — Oppedahl Patent Law Firm LLC

(57) ABSTRACT

The present invention discloses a method and device for the bias control of an MZ modulator. The method comprises: during startup of an MZ modulator, inputting a linearly changing bias control voltage to the bias electrode of the MZ modulator and obtaining the output optical power of the MZ modulator so as to determine a bias control voltage corresponding to a preset operating point; then enabling a communication electrical signal to be input to the radio frequency electrode of the MZ modulator, carrying out an amplitude modulation on the communication electrical signal by a low-frequency sinusoidal pilot signal, and inputting the determined bias control voltage to the bias electrode simultaneously; and sampling the output optical signals of the MZ modulator, comparing the sampled optical signal with the pilot signal, and adjusting the bias control voltage input to the bias electrode according to the result of the comparison.

11 Claims, 9 Drawing Sheets

U.S. PATENT DOCUMENTS

| | | |
|---|---|---|
| 7,418,211 B2 | 8/2008 | Akiyama et al. |
| 7,426,224 B2 | 9/2008 | Ishibashi |
| 2004/0190103 A1 | 9/2004 | Fujita et al. |
| 2004/0190910 A1 | 9/2004 | Akiyama et al. |
| 2006/0127104 A1* | 6/2006 | Harley et al. ............ 398/198 |
| 2006/0263098 A1* | 11/2006 | Akiyama et al. ......... 398/188 |
| 2007/0248130 A1 | 10/2007 | Ishibashi |
| 2009/0034988 A1 | 2/2009 | Akiyama et al. |
| 2009/0238510 A1* | 9/2009 | Kawanishi et al. ............ 385/2 |

FOREIGN PATENT DOCUMENTS

| | | |
|---|---|---|
| CN | 101354515 A | 1/2009 |
| EP | 0448832 A2 | 10/1991 |
| EP | 0710867 A2 | 5/1996 |
| EP | 1884820 A2 | 2/2008 |
| EP | 1939679 A2 | 7/2008 |
| GB | 2293022 A | 3/1996 |
| JP | 2002328348 A | 11/2002 |

OTHER PUBLICATIONS

English Translation of the Written Opinion of the International Search Authority in international application No. PCT/CN2009/073058, mailed on Nov. 12, 2009.

Supplementary European Search Report in European application No. 09811016.6, mailed Oct. 18, 2011.

* cited by examiner

METHOD AND DEVICE FOR BIAS CONTROL OF A LASER MZ MODULATOR

TECHNICAL FIELD

The present invention relates to the technical field of communications, and in particular to a method and device for the bias control of an MZ modulator.

BACKGROUND

Due to its advantages of high speed, large extinction ratio, high input optical power, adjustable chirp and insensitivity to wavelength, external modulation is capable of increasing the transmission distance of a wavelength division system and improving transmission speed and is thus widely applied to wavelength division systems. However, phase shift occurs in an MZ (Mach-Zehnder) modulator based on $LiNbO_3$ material as the operating point of such modulator is influenced by temperature, mechanical stress and the aging of components, the output performance of optical signal is consequently degraded, therefore, when such modulator is used, a feedback control is required for the bias operating point of such modulator to form a closed loop to guarantee a stable bias.

As shown in FIG. 1, the conventional bias control device mainly consists of a modulator, a driver, a signal generator, an amplifier, a correlator and other components, and the operating principle of the bias control device is as follows: the signal generator generates a low-frequency sinusoidal pilot signal; by controlling the gain control end of the $LiNbO_3$ driver, an amplitude modulation (AM for short) is conducted on a high-speed communication electrical signal in an extremely small proportion; a Mach-Zehnder modulation is carried out by the $LiNbO_3$ modulator to convert the high-speed communication electrical signal to an optical signal, and then the optical signal is output to an optical fiber line; part of light is detected by a photoelectric diode (PD for short) attached to the $LiNbO_3$ modulator, amplified, filtered and compared with the initial input pilot signal, and then a correlate analysis is carried out to obtain an error voltage for a bias control, and a closed-loop feedback control is carried out on a bias point of the modulator with the error voltage.

FIG. 2 shows a flow chart of a conventional $LiNbO_3$ bias control method, which is a typical combination of a relevant detection and a proportional integral algorithm and mainly comprises the following steps:

step S214: inputting a communication electrical signal to the input end of a modulator;

step S216: carrying out an electrical-optical conversion on a pilot signal output from the output end and detecting the converted signal by a PD;

step S218: sampling the signals detected by the PD via a control program, amplifying and filtering the signal, and inputting the amplified and filtered signal to a correlator;

step S220: performing a correlate analysis by the correlator according to the input signal and the pilot signal to calculate the current bias error;

step S222: adjusting the current bias control voltage according to the magnitude and the polarity of the current bias error so that the bias is adjusted toward a correct operating point; specifically, executing step S224 to increase the bias control voltage when the current bias error is low; executing step S226 to perform no adjustment on the bias voltage when the current bias error is normal; and executing step S228 to reduce the bias control voltage when the current bias error is high.

As mentioned above, in the current bias control technologies, a small-amplitude low-frequency pilot signal is inserted into the communication signal of the radio frequency (RF for short) electrode of a modulator to modulate the communication signal into an optical signal, and then a spectrophotometric detection is carried out on the modulated pilot signal at a signal output position. The detected signal is compared with the initial signal in amplitude and phase through a correlate analysis to detect a bias error, the bias error is integrated and amplified and then output to the bias electrode of the modulator to control the bias phase of the modulator and keep the operating point stable.

In this control method, as the amplitude of the bias control voltage is small in each adjustment, the convergence speed is low during startup of the MZ modulator, and as a consequence, the time for achieving a stable operating point of the MZ modulator is long, sometimes up to several seconds or even tens of seconds.

SUMMARY

On this account, the present invention provides a method and device for the bias control of an MZ modulator, which solves the problem of low convergence speed and long control time in existing bias control methods.

According to one aspect of the present invention, a method for the bias control of an MZ modulator is provided.

The method for the bias control of an MZ modulator provided in the present invention comprises: during startup of an MZ modulator, inputting a linearly changing bias control voltage to a bias electrode of the MZ modulator and obtaining output optical power of the MZ modulator so as to determine a bias control voltage corresponding to a preset operating point; then enabling a communication electrical signal to be input to a radio frequency electrode of the MZ modulator, carrying out an amplitude modulation on the communication electrical signal by a low-frequency sinusoidal pilot signal, and inputting the determined bias control voltage to the bias electrode simultaneously; and sampling output optical signals of the MZ modulator, comparing the sampled optical signal with the pilot signal, and adjusting the bias control voltage input to the bias electrode according to the result of the comparison.

According to another aspect of the present invention, a device for the bias control of an MZ modulator is provided.

The device for the bias control of an MZ modulator provided in the present invention comprises: a photoelectric diode, a first amplifier, a filter, a correlator, a control unit and a selection switch, wherein the photoelectric diode is used for detecting output optical power of the MZ modulator; the control unit is used for inputting a linearly changing bias control voltage to a bias electrode of the MZ modulator and determining a bias control voltage corresponding to a preset operating point according to the output optical power detected by the photoelectric diode; the correlator is used for inputting the bias control voltage determined by the control unit to the bias electrode of the MZ modulator; and the selection switch is used for connecting the linearly changing bias control voltage output by the control unit to the bias electrode during startup of the MZ modulator, and connecting the bias control voltage output by the correlator to the bias electrode during the normal operating process of the MZ modulator.

According to another aspect of the present invention, another device for the bias control of an MZ modulator is provided.

Another device for the bias control of an MZ modulator provided in the present invention comprises: a first inputting module, an obtaining module, a determining module, a second inputting module and an adjusting and controlling module, wherein the first inputting module is used for inputting a linearly changing bias control voltage to a bias electrode of the MZ modulator; the obtaining module is used for obtaining output optical power of the MZ modulator; the determining module is used for determining a bias control voltage corresponding to a preset operating point according to the bias control voltage input by the first inputting module and the output optical power obtained by the obtaining module; the second inputting module is used for inputting the bias control voltage determined by the determining module to the bias electrode during the normal operating process of the MZ modulator; and the adjusting and controlling module is used for adjusting the bias control voltage input by the second inputting module according to the output optical power of the MZ modulator and an input pilot signal during the normal operating process of the MZ modulator.

By means of at least one of the above solutions, a linearly changing bias control voltage is input to the bias electrode of an MZ modulator during startup of the MZ modulator to scan the characteristics of the modulator so as to obtain a bias control voltage corresponding to a preset operating point, and the bias control voltage is taken as an initial bias control voltage to perform a closed-loop feedback control on the MZ modulator, thus the time for achieving the stabilization of the MZ modulator is shortened and the accuracy of bias control is improved.

Other characteristics and advantages of the present invention are illustrated in the following specification, part of which become apparent from the specification or can be understood by implementing the method and device disclosed in the present invention. The purpose and other advantages of the present invention can be realized and obtained through the structures especially specified in the specification, claims and the accompanying drawings.

BRIEF DESCRIPTION OF THE DRAWINGS

The accompanying drawings illustrated here are provided to make the present invention understood better and to form part of this application; and the exemplary embodiments of the present invention and the description thereof are provided for explaining the present invention, instead of constituting an improper limitation to the present invention. In these accompanying drawings.

DETAILED DESCRIPTION

Function Overview

The present invention provides a solution for the bias control of an MZ modulator in view of the problem that the existing MZ modulator requires a long time to achieve a stable operation during its startup; in this solution, during startup of an MZ modulator, a linear changing bias control voltage is input to the bias electrode of the MZ modulator under the circumstance that the input of a communication signal is cut off, and the input/output characteristics of the modulator are scanned so as to determine a bias control voltage corresponding to a preset operating point; and the bias control voltage, as an initial bias control voltage, is input to the bias electrode of the modulator during the normal operating process of the modulator to carry out a closed-loop feedback control on the MZ modulator.

Preferred embodiments of the present invention are illustrated below in combination with the accompanying drawings, it should be understood that the preferred embodiments described here are only provided for illustrating and explaining the present invention but not limiting the present invention.

According to an embodiment of the present invention, a device for the bias control of an MZ modulator is provided first.

Figure 1:
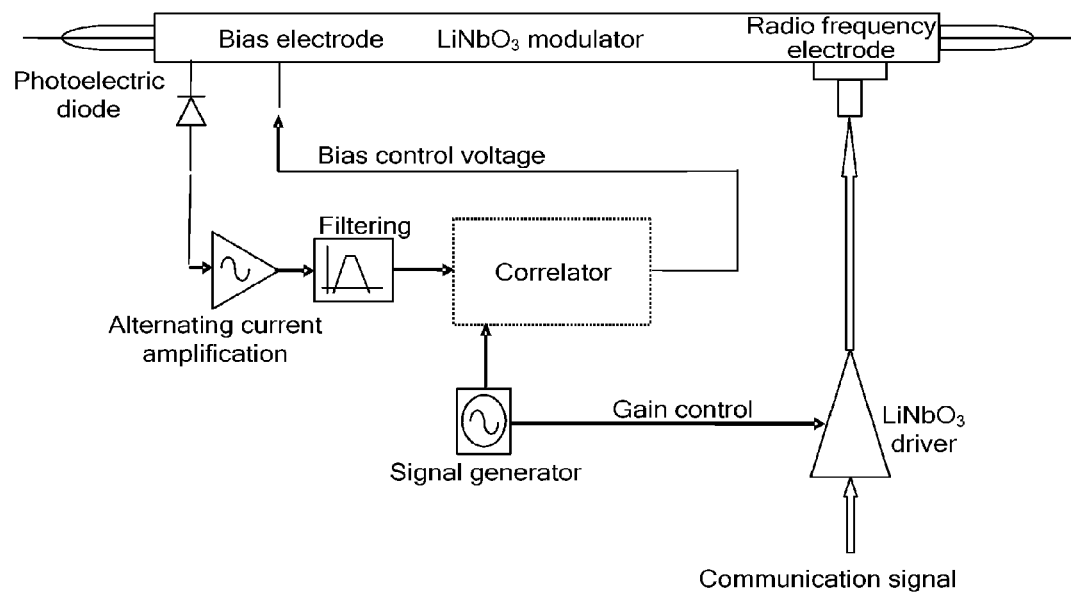
FIG. 1 is a block diagram illustrating the constitution of an existing bias control device.
Figure 3:
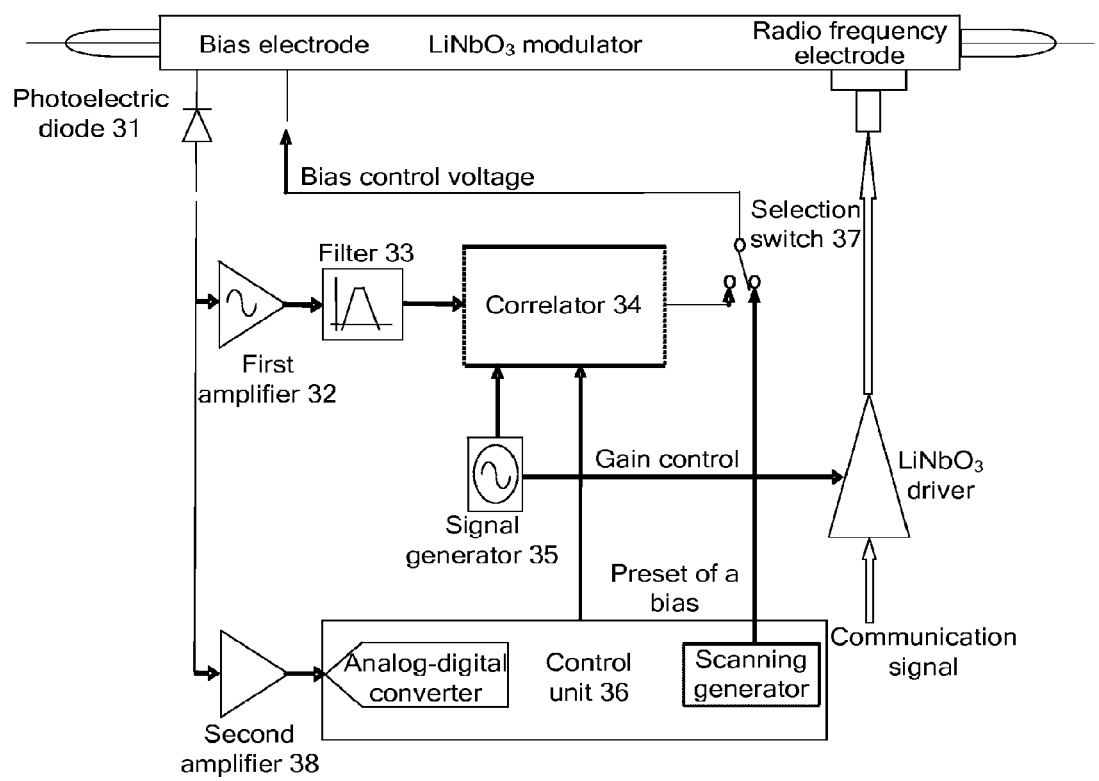
FIG. 3 is a structural block diagram illustrating a device for the bias control of an MZ modulator according to an embodiment of the present invention.

FIG. 3 is a structural block diagram illustrating a device for the bias control of an MZ modulator according to an embodiment of the present invention; it can be seen from FIG. 3 that the bias control device according to the embodiment of the present invention further includes a control unit and a selection switch on the basis of the conventional bias control device (as shown in FIG. 1). As shown in FIG. 3, the device for the bias control of an MZ modulator according to the embodiment of the present invention comprises a photoelectric diode PD 31, a first amplifier 32, a filter 33, a signal generator 35, a correlator 34, a control unit 36 and a selection switch 37, each of which is described below in combination with the accompanying drawings.

The photoelectric diode PD 31 is used for detecting the output optical power of the MZ modulator.

The first amplifier 32, one end of which is connected with the PD 31, and the other end of which is connected with the filter 33, is used for amplifying the output optical power detected by the PD 31 and inputting the amplified output optical power to the filter 33.

The filter 33, one end of which is connected with the first amplifier 32, and the other end of which is connected with the correlator 34, is used for filtering the output optical power amplified by the first amplifier 32 and inputting the filtered output optical power to the correlator 34.

One end of the correlator 34 is connected with the filter 33, and the other end is connected with the bias electrode of the MZ modulator via the selection switch 37, moreover, the correlator 34 is further connected with the signal generator 35 and the control unit 36; and the correlator 34 is used for inputting the bias control voltage input by the control unit 36 to the bias electrode of the MZ modulator, comparing the output optical power which is detected by the PD 31 and processed by the first amplifier 32 and the filter 33 with the pilot signal received by the signal generator 35, and adjusting the bias control voltage input to the bias electrode according to the result of the comparison.

The selection switch 37 is connected with the control unit 36 and the correlator 34; and the selection switch 37 is used for connecting the linearly changing bias control voltage output by the control unit 36 to the bias electrode during startup of the MZ modulator and connecting the bias control voltage output by the correlator 34 to the bias electrode during the normal operating process of the MZ modulator.

In order to facilitate the processing of the output optical power obtained by the control unit 36, a second amplifier 38 may be added between the control unit 36 and the PD 31 to amplify the optical power detected by the PD 31, as shown in FIG. 3.

In order to convert the obtained output optical power from an analog signal to a digital signal, an analog-digital converter may be contained in the control unit 36 to convert the output optical power into a digital value. Moreover, the control unit 36 may further comprise a scanning generator for generating and outputting a linearly changing bias control voltage so that the output optical power of the MZ modulator can present the sinusoidal variation shown in FIG. 4 in the case of the continuous input of the bias control voltage.

Figure 4:
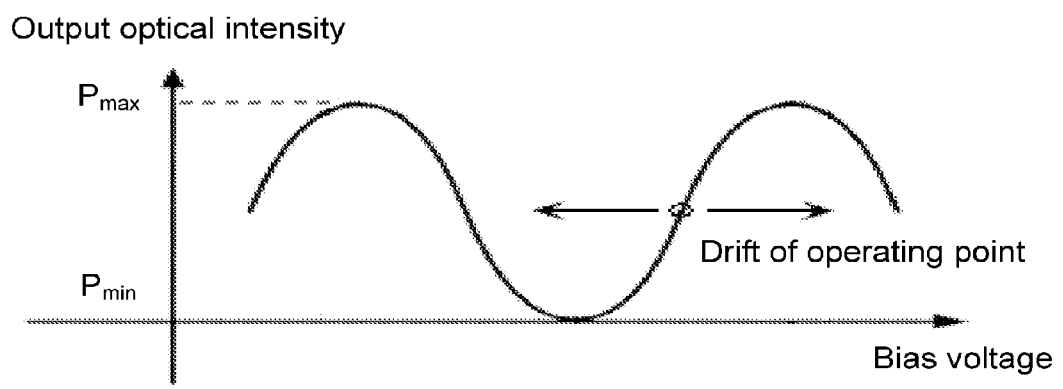
FIG. 4 is a characteristic curve diagram of the output optical power of an MZ modulator input with a linearly changing bias control voltage according to an embodiment of the present invention.

As shown in FIG. 4, the output optical power of a $LiNbO_3$ modulator periodically varies in accordance with the law of trigonometric functions when the bias electrode is input with a linearly changing bias control voltage and the RF electrode is input with no signal.

Figure 5:
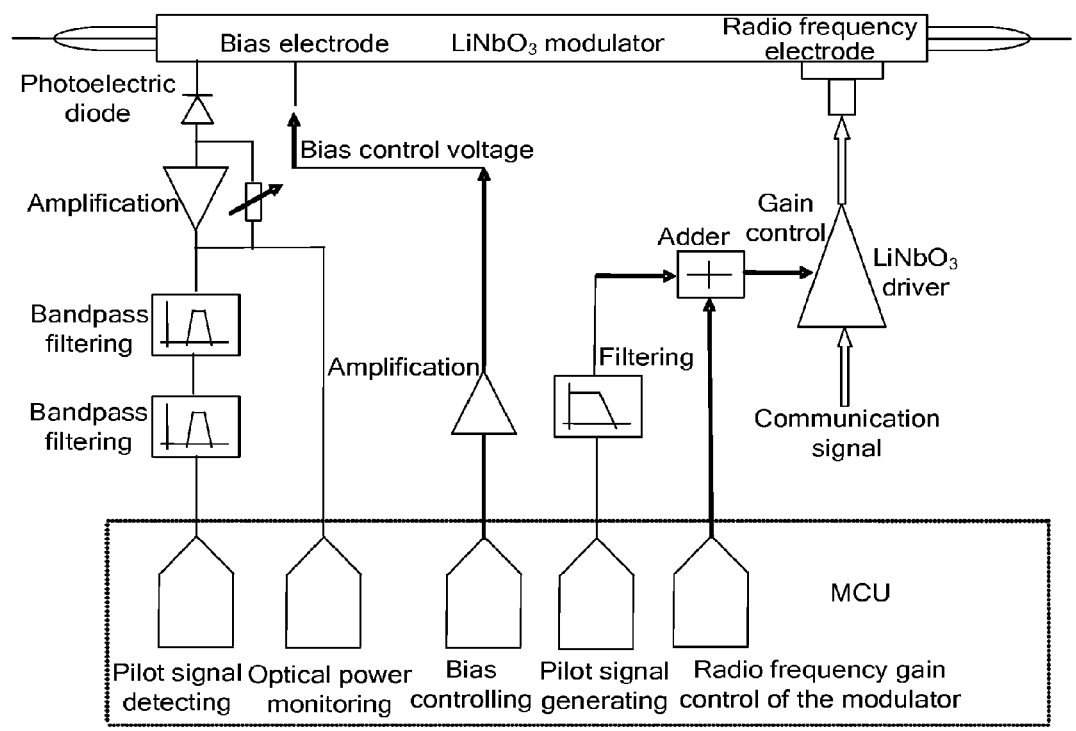
FIG. 5 is a structural block diagram illustrating a bias control device according to a preferred embodiment of the present invention.

FIG. 5 is a structural diagram illustrating the above specific bias control device in specific implementation. The bias control device employs an analog-digital mixed circuit architecture. Its hardware part consists of an MCU microprocessor, a transimpedance amplifier, a two-stage filter, a bias amplifier and an adder; compared with the conventional solution, the bias control device is added with very few components, including a pilot signal detector ADC0, an optical power monitor ADC1, a bias controller DAC0, a pilot signal generator DAC1, and a radio frequency gain controller DAC2 for a driver; and control flow of steps is mainly achieved through MCU software programming. The conventional control flow is divided into the following two steps by an additional open-loop control loop: first, an open-loop control is performed, the output characteristic of an MZ modulator is detected to obtain a bias control voltage corresponding to a preset operating point; then, the obtained bias control voltage, as an initial value, is input to the bias electrode, to perform a closed-loop control and track characteristic drift, thus the time for a stabilization control is shortened.

According to an embodiment of the present invention, a method for the bias control of an MZ modulator is further provided, which can be realized by the bias control device above.

Figure 6:
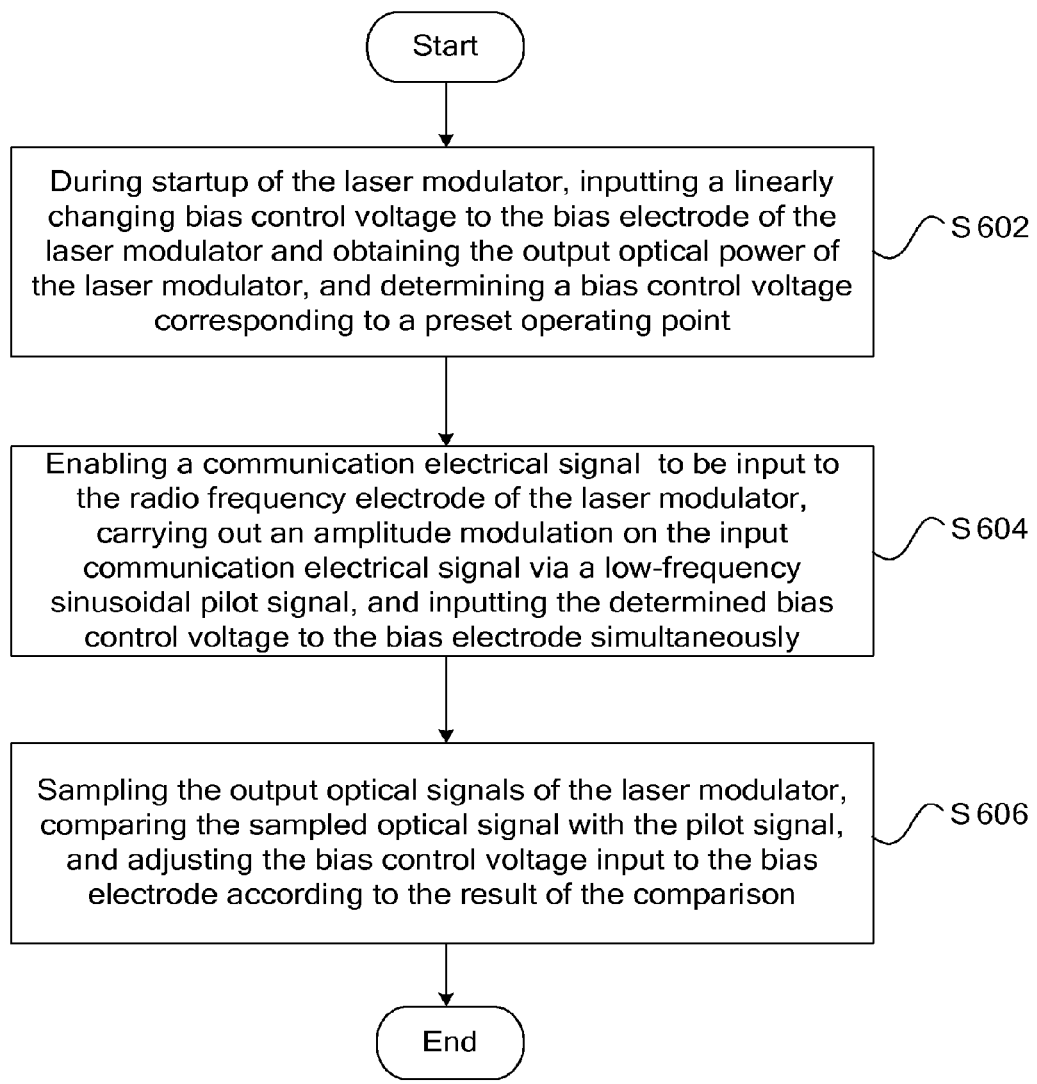
FIG. 6 is a flow chart illustrating a method for the bias control of an MZ modulator according to an embodiment of the present invention.

FIG. 6 is a control flow illustrating a method for the bias control of an MZ modulator according to an embodiment of the present invention, as shown in FIG. 6, the method for the bias control of an MZ modulator mainly comprises the following processing steps:

step S602: during startup of the MZ modulator, inputting a linearly changing bias control voltage to the bias electrode of the MZ modulator and obtaining the output optical power of the MZ modulator, scanning the input/output characteristics of the modulator, and determining a bias control voltage corresponding to a preset operating point;

step S604: enabling a signal to be input to the radio frequency electrode of the MZ modulator, carrying out an amplitude modulation on the input signal via a low-frequency sinusoidal pilot signal, and inputting the above determined bias control voltage to the bias electrode simultaneously; and step S606: sampling the output optical signals of the MZ modulator, comparing the sampled optical signal with the pilot signal, and adjusting the bias control voltage input to the bias electrode according to the result of the comparison.

Each of the processing above is described below in detail.

(1) Step S602

The input of a communication signal to the RF electrode of the MZ modulator and the input to the correlator are cut off during startup of the MZ modulator, then a linearly changing bias control voltage is input to the bias electrode of the MZ modulator via the scanning generator of the control unit; the output end of the MZ modulator can output the output optical power presenting the sinusoidal variation shown in FIG. 4 under the effect of the bias voltage; the PD can detect the output optical power, an amplification and analog-digital conversion are carried out on the output optical power, and then the corresponding relation between the input bias control voltage and the output optical power can be obtained.

As the preset operating point is generally the point corresponding to the maximum value, the minimum value or the intermediate value of the output optical power, therefore the bias control voltage corresponding to the output optical power corresponding to the preset operating point, that is, the bias control voltage corresponding to the preset operating point, is obtained after the corresponding relation between the input bias control voltage and the output optical power is obtained.

The processing of this step is actually an open-loop control process, which aims to obtain the bias control voltage corresponding to the preset operating point, and in this step, the communication signal is cut off, the corresponding relation between the input bias control voltage and the output optical power can be detected in tens of milliseconds, thereby the bias control voltage of the correct operating point is obtained.

(2) Step S604

In this step, the input of a communication signal to the RF electrode of the MZ modulator is activated, a low-frequency sinusoidal pilot signal is generated by the signal generator to carry out an amplitude modulation on the communication signal before the communication signal is input to the RF electrode; the control unit outputs the bias control voltage determined in step S602 to the correlator, and the correlator outputs the determined bias control voltage, as an initial control voltage, to the bias control electrode.

(3) Step S606

In this step, the PD carries out an optical-electrical conversion on the output optical signal of the MZ modulator to obtain an output signal; the obtained output signal is amplified and filtered and then output to the correlator; the correlator compares the input optical signal with the pilot signal input by the signal generator, and adjusts the bias control voltage of the bias electrode according to the result of the comparison.

The processing of this step is identical to the conventional bias control process, in the operating process of the MZ modulator, the operating point of the modulator is kept at the position where the optical power is Pmax, Pmin or equal to (Pmax+Pmin)/2 by adjusting the bias control voltage in the case of a curve drift, when there is left or right drift in the characteristic curve of the output optical power due to external factors such as temperature, stress and aging. As the output of the correlator is already the correct bias operating point, the control loop only needs to track the drift of the bias operating point caused by external factors, therefore the time for achieving the stabilization of the modulator is greatly shortened.

The method according to the embodiment of the present invention overcomes the shortcomings of low convergence speed and long control time in the existing bias control technologies and thereby shortens the time for realizing a stabilization control and improves control accuracy.

Figure 2:
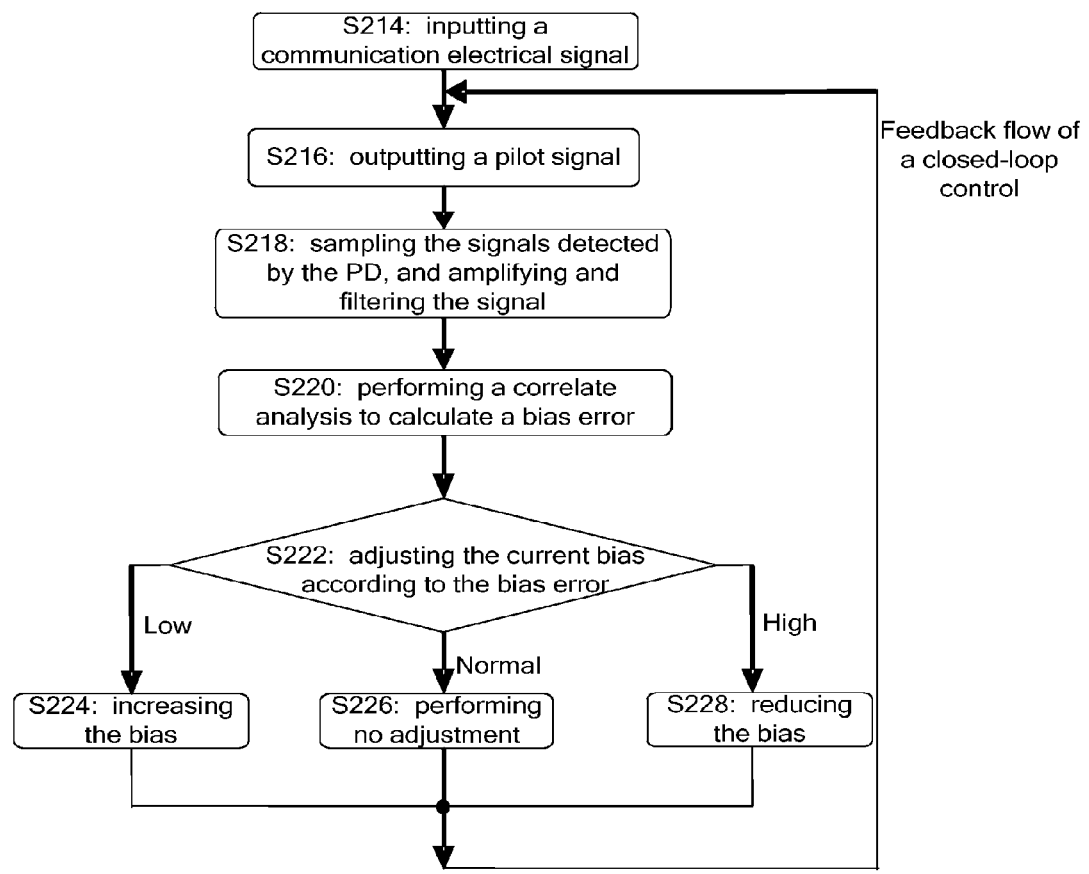
FIG. 2 is a flow chart of an existing LiNbO$_3$ bias control method.
Figure 7:
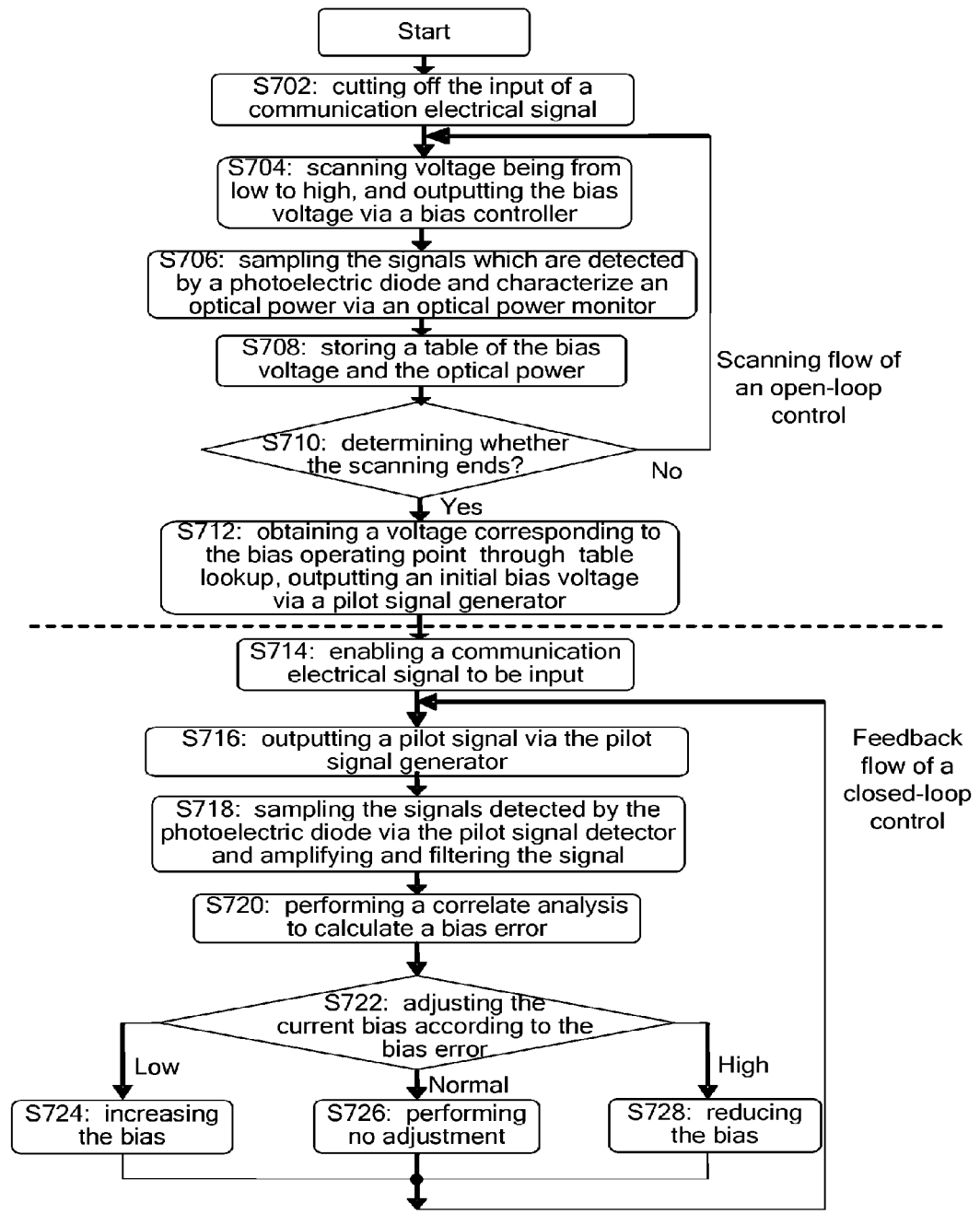
FIG. 7 is a flow chart illustrating the specific implementation of a method for the bias control of an MZ modulator according to an embodiment of the present invention.

FIG. 7 is a flow chart illustrating the specific implementation of a method for the bias control of an MZ modulator according to an embodiment of the present invention, as shown in FIG. 7, the specific implementation of the method mainly comprises the following steps:

step S702: cutting off a communication electrical signal;

step S704: inputting a control voltage to perform linear scanning, outputting the control voltage to the bias control end of the modulator via a DAC1, the output optical power varies in accordance with the current bias electric-optical modulation characteristic of the modulator under the effect of the bias scanning voltage;

step S706: sampling, via an ADC1, the PD voltage signals which are detected and by the PD and amplified and characterize an optical power;

step S708: storing the optical power corresponding to every bias voltage;

step S710: determining whether the scanning ends, if so, executing step S712, otherwise, returning to step S704;

after the scanning ends, the bias characteristic table of the modulator can be obtained according to the stored optical power corresponding to every bias voltage; and step S712: obtaining a voltage corresponding to the bias operating point through table lookup as required and outputting the obtained voltage via the DAC1, then the initial bias can be established rapidly, and the scanning flow of an open-loop control is completed;

the steps S702-S712 above are the scanning flow of the open-loop control;

the feedback flow of a closed-loop control is substantially identical to the conventional $LiNbO_3$ bias control method shown in FIG. 2, which mainly comprises the following steps:

step S714: controlling and enabling a communication electrical signal;

step S716: outputting, via a DAC1, a pilot signal which is then detected by a PD after being subjected to an electrical-optical conversion;

step S718: sampling the signals detected by the PD via an ADC0, and amplifying and filtering the signal;

step S720: performing a correlate analysis using the amplified and filtered signal and the pilot signal to calculate the current bias error; and step S722: adjusting the current bias voltage according to the magnitude and the polarity of the current bias error; specifically, executing step S724 to increase the bias control voltage when the current bias error is low, executing step S726 to perform no adjustment on the bias control voltage when the current bias error is normal, and executing step S728 to reduce the bias control voltage when the current bias error is high; as the initial bias control voltage has already been established in the scanning flow of the open-loop control, a bias stabilization can be realized without requiring much adjustment in the feedback flow of the closed-loop control.

According to an embodiment of the present invention, a device for the bias control of an MZ modulator is further provided, which is capable of realizing the method above.

Figure 8A:
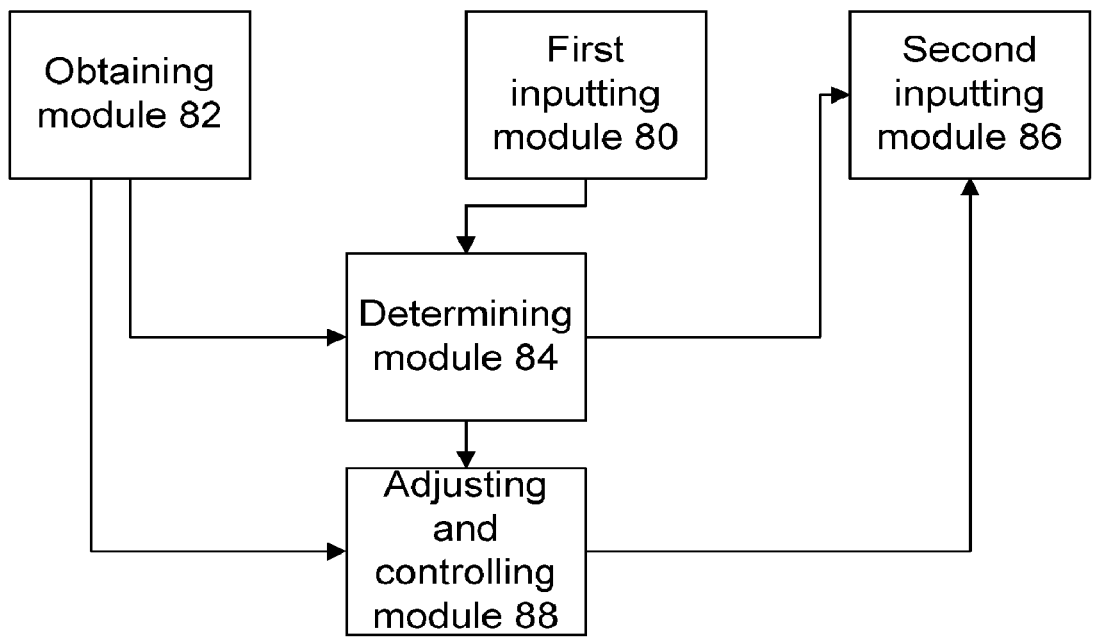
FIG. 8A is a structural block diagram illustrating another device for the bias control of an MZ modulator according to an embodiment of the present invention.
Figure 8B:
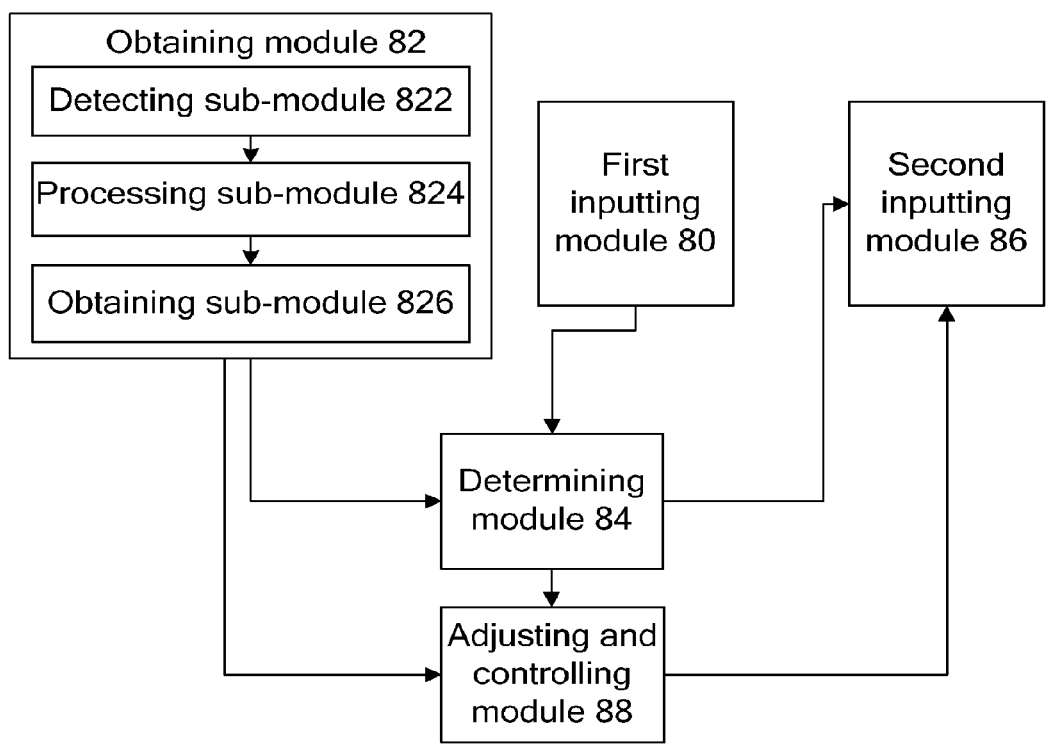
FIG. 8B is a structural block diagram illustrating another device for the bias control of an MZ modulator according to a preferred embodiment of the present invention.

FIG. 8A is a structural block diagram illustrating a device for the bias control of an MZ modulator according to an embodiment of the present invention; FIG. 8B is a structural block diagram illustrating a device for the bias control of an MZ modulator according to a preferred embodiment of the present invention. As shown in FIG. 8A, the device for the bias control of an MZ modulator according to the embodiment of the present invention comprises: a first inputting module 80, an obtaining module 82, a determining module 84, a second inputting module 86 and an adjusting and controlling module 88. Each of the modules above is described below in combination with the accompanying drawings:

the first inputting module 80 is connected with the bias electrode of the MZ modulator, and used for inputting a linearly changing bias control voltage to the bias electrode of the MZ modulator;

the obtaining module 82 is connected with the output end of the MZ modulator, and used for obtaining the output optical power of the MZ modulator;

the determining module 84 is connected with the first inputting module 80 and the obtaining module 82, and used for determining a bias control voltage corresponding to a preset operating point according to the bias control voltage input by the first inputting module 80 and the output optical power obtained by the obtaining module 82;

the second inputting module 86 is connected with the determining module 84 and the bias electrode of the MZ modulator, and used for inputting the bias control voltage determined by the determining module 84 to the bias electrode; and the adjusting and controlling module 88 is connected with the obtaining module 82 and the second inputting module 86, and used for adjusting the bias control voltage input by the second inputting module 86 according to the output optical power of the MZ modulator obtained by the obtaining module 82 and an input pilot signal.

Further, as shown in FIG. 8B, the obtaining module 82 may further comprise: a detecting sub-module 822, a processing sub-module 824, and an obtaining sub-module 826, wherein the detecting sub-module 822 is used for detecting the output optical power of the MZ modulator when the first inputting module 80 inputs a bias control voltage; the processing sub-module 824 is connected with the detecting sub-module 822 and used for carrying out an amplification and analog-digital conversion on the output optical power detected by the detecting sub-module 822; and the obtaining sub-module 826 is connected with the processing sub-module 824 to obtain the output optical power processed by the processing sub-module 824.

As stated above, by means of the present invention, the input/output characteristics of the MZ modulator are scanned by cutting off the communication signal and inputting the linearly changing bias control voltage to the bias electrode of the MZ modulator during startup of the MZ modulator, thereby a bias control voltage corresponding to the operating point of the MZ modulator is obtained, and the bias control voltage is input to the bias control electrode as the initial bias control voltage of the MZ modulator during the normal operation of the MZ modulator and adjusted according to the drift generated in the operation. As the initial bias control voltage can be detected in tens of milliseconds after the communication signal is cut off and only the drift of the bias operating point caused by external factors is required to be tracked during operation process, therefore the time for achieving the stabilization of the MZ modulator is shortened, the control precision is improved, and the setup time of an optical transmitter is also shortened.

Apparently, it should be understood by those skilled in the art that various modules or steps of the present invention can be realized by a universal computing device, centralized in a single computing device or distributed in a network consisting of multiple computing devices, and optionally realized by program codes executable to computing devices; therefore the modules or steps can be stored in a storage device to be executed by a computing device or separately made into respective integrated circuit module, or some of the modules or steps are made into a single integrated circuit module. Thus the present invention is not limited to combination of any specific hardware and software.

The mentioned above is only preferred embodiments of the present invention but not limitation to the present invention, various modification and variations can be devised by those skilled in the art, any modification, equivalent substitution and improvement devised without departing from the spirit and scope of the present invention shall be included in the protection scope of the present invention.

The invention claimed is:

1. A method for the bias control of an MZ modulator, comprising:
   during startup of an MZ modulator, inputting a linearly changing bias control voltage to a bias electrode of the MZ modulator and obtaining output optical power of the MZ modulator so as to determine a bias control voltage corresponding to a preset operating point;
   enabling a communication electrical signal to be input to a radio frequency electrode of the MZ modulator, carrying out an amplitude modulation on the communication electrical signal by a low-frequency sinusoidal pilot signal, and inputting the determined bias control voltage to the bias electrode simultaneously; and
   sampling output optical signals of the MZ modulator, comparing the sampled optical signal with the pilot signal, and adjusting the bias control voltage input to the bias electrode according to the result of the comparison.

2. The method according to claim 1, wherein the step of inputting a linearly changing bias control voltage to the bias electrode of the MZ modulator specifically comprises:
   inputting a linearly changing bias control voltage in order that the output optical power of the MZ modulator varies sinusoidally.

3. The method according to claim 1, wherein the step of determining a bias control voltage corresponding to a preset operating point specifically comprises:
   determining a corresponding relation between the input bias control voltage and the output optical power; and
   obtaining the bias control voltage corresponding to the preset operating point according to the corresponding relation and the output optical power corresponding to the preset operating point.

4. The method according to claim 3, wherein the step of determining the corresponding relation between the input bias control voltage and the output optical power specifically comprises:
   detecting the output optical power and carrying out an amplification and analog-digital conversion on the optical power to obtain the value of the converted output optical power; and
   obtaining the corresponding relation between the output optical power and the input bias control voltage according to the value of the input bias control voltage and the value of the converted output optical power.

5. The method according to claim 1, wherein the preset operating point comprises the points corresponding to the maximum, the minimum and the intermediate values of the output optical power.

6. The method according to claim 2, wherein the step of determining a bias control voltage corresponding to a preset operating point specifically comprises:
   determining a corresponding relation between the input bias control voltage and the output optical power; and
   obtaining the bias control voltage corresponding to the preset operating point according to the corresponding relation and the output optical power corresponding to the preset operating point.

7. A device for the bias control of an MZ modulator, comprising a photoelectric diode, a first amplifier, a filter, a correlator, and further comprising a control unit and a selection switch, wherein
   the photoelectric diode being used for detecting output optical power of the MZ modulator;
   the control unit being used for inputting a linearly changing bias control voltage to a bias electrode of the MZ modulator and determining a bias control voltage corresponding to a preset operating point according to the output optical power detected by the photoelectric diode;
   the correlator being used for inputting the bias control voltage, as an initial bias control voltage and determined by the control unit, to the bias electrode of the MZ modulator; and
   the selection switch being used for connecting the linearly changing bias control voltage output by the control unit to the bias electrode during startup of the MZ modulator, and connecting the bias control voltage output by the correlator to the bias electrode during the normal operating process of the MZ modulator.

8. The device according to claim 7, further comprising:
   a second amplifier for amplifying the output optical power detected by the photoelectric diode and then inputting the amplified output optical power to the control unit.

9. The device according to claim 7, wherein the control unit comprises:
   a scanning generator for generating a linearly changing bias control voltage and inputting the linearly changing bias control voltage to the bias electrode of the MZ modulator; and
   an analog-digital converter for converting the output optical power detected by the photoelectric diode into a digital value.

10. A device for the bias control of an MZ modulator, comprising:
    a first inputting module for inputting a linearly changing bias control voltage to a bias electrode of the MZ modulator;
    an obtaining module for obtaining output optical power of the MZ modulator;
    a determining module for determining a bias control voltage corresponding to a preset operating point according to the bias control voltage input by the first inputting module and the output optical power obtained by the obtaining module;

a second inputting module for inputting the bias control voltage determined by the determining module to the bias electrode during the normal operating process of the MZ modulator; and an adjusting and controlling module for adjusting the bias control voltage input by the second inputting module according to the output optical power of the MZ modulator and an input pilot signal during the normal operating process of the MZ modulator.

11. The device according to claim 10, wherein the obtaining module comprises:

a detecting sub-module for detecting the output optical power of the MZ modulator when the first inputting module inputs the bias control voltage;

a processing sub-module for carrying out an amplification and analog-digital conversion on the output optical power detected by the detecting sub-module; and an obtaining sub-module for obtaining the output optical power processed by the processing sub-module.

* * * * *